United States Patent [19]

Evans et al.

[11] 4,159,494

[45] Jun. 26, 1979

[54] FLEXIBLE DISK IN REVERSIBLE CARTRIDGE

[75] Inventors: David A. Evans, Boulder, Colo.; Herm J. Greenberg, San Jose; Frank E. Talke, Morgan Hill, both of Calif.

[73] Assignee: International Business Machines Corporation, Armonk, N.Y.

[21] Appl. No.: 913,713

[22] Filed: Jun. 8, 1978

[51] Int. Cl.² .................. G11B 5/82; G11B 5/016; G11B 23/02

[52] U.S. Cl. .......................... 360/133; 206/444; 360/99; 360/135

[58] Field of Search ............... 360/133, 135, 99, 86; 206/444

[56] References Cited

U.S. PATENT DOCUMENTS

| | | | |
|---|---|---|---|
| 3,932,895 | 1/1976 | Ward | 360/135 |
| 3,951,264 | 4/1976 | Heidecker | 360/99 |
| 4,003,088 | 10/1975 | Schwartz | 360/133 |

FOREIGN PATENT DOCUMENTS 539330  1/1977  U.S.S.R. .................. 360/99

Primary Examiner—Alfred H. Eddleman
Attorney, Agent, or Firm—Henry E. Otto, Jr.

[57] ABSTRACT

A cartridge comprises a housing containing a flexible record disk connected to a hub that is rotatable relative to the housing by a drive spindle. The cartridge is configured so as to be reversibly mountable on the spindle, for enabling the transducer to access and transducingly engage selectively either face of the disk through respective slots in the housing. The housing is formed of two substantially identical portions, each providing a Bernoulli surface having parts extending at equal angles in opposing divergent directions from a central part that is perpendicular to the plane of disk rotation. In an alternate configuration, the Bernoulli surface has only one part extending in a divergent direction from a remaining part that is perpendicular to the plane of disk rotation.

10 Claims, 6 Drawing Figures

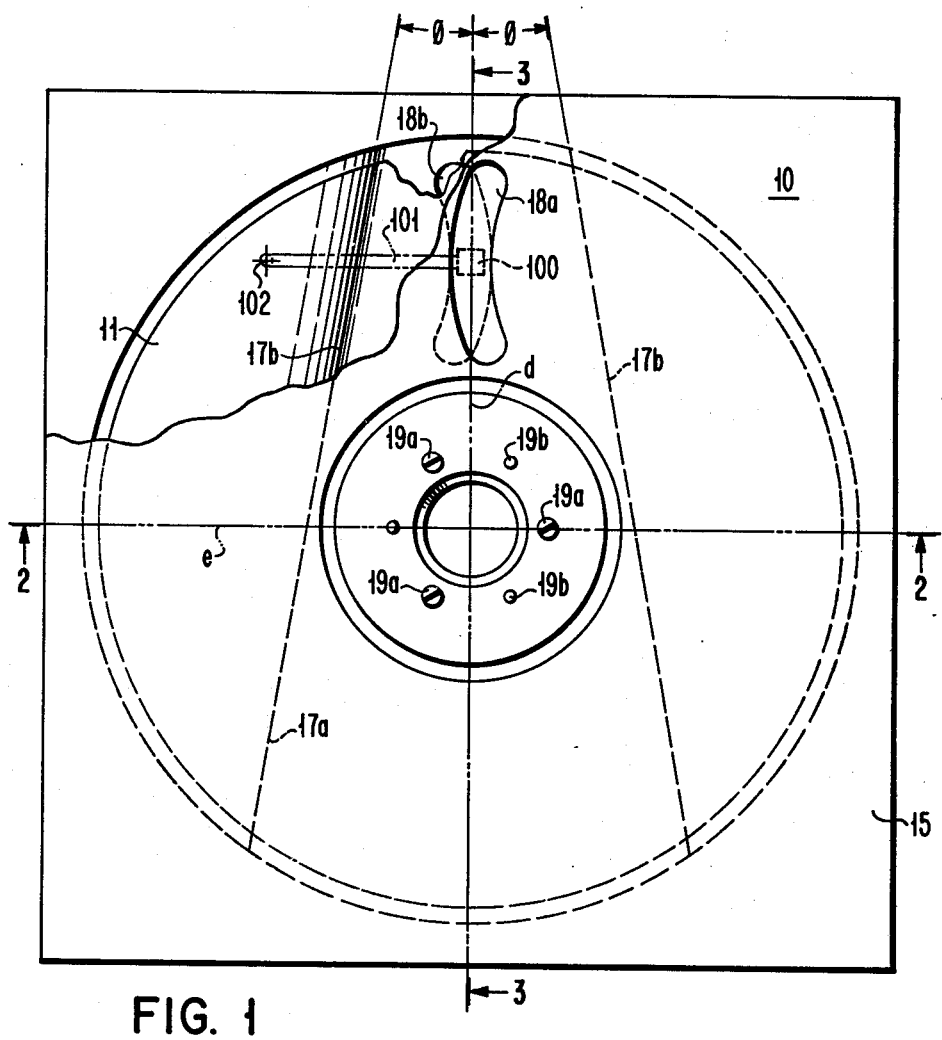
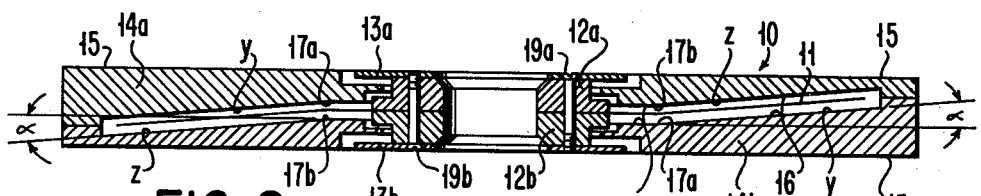
FIG. 2
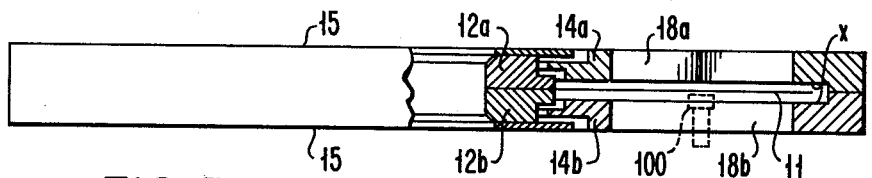
FIG. 3

FLEXIBLE DISK IN REVERSIBLE CARTRIDGE

RELATED APPLICATION ASSIGNED TO SAME ASSIGNEE AS THE PRESENT INVENTION

Hatchett et al, U.S. Ser. No. 847,376, filed Oct. 31, 1977, entitled "Flexible Record Disk Signal Storage Apparatus," which is a continuation of U.S. Ser. No. 777,233 filed Mar. 7, 1977 (now abandoned).

BACKGROUND OF THE INVENTION

This invention relates to data storage apparatus of the type comprising a flexible record disk mounted for rotation over and relative to a stationary Bernoulli surface, and relates more particularly to a cartridge containing a flexible record disk, which cartridge is reversibly mountable on a drive spindle so as to permit transducing access selectively to either planar surface of the disk.

DESCRIPTION OF THE PRIOR ART

It has heretofore been found that mechanical stability and hence the recording on and playback from a flexible magnetic disk can be enhanced by having the cartridge which contains the disk provide a generally concave stationary Bernoulli surface adjacent the rotatable disk. The disk rotates on an air cushion above said surface, and the surface has a slot through which a transducer may access the convex side of the disk.

U.S. Pat. No. 3,830,506 discloses a flexible disk that rotates on an air cushion above a concave stabilizing surface. A radially movable transducer accesses the concavely curved cylindrical surface of the disk (i.e., the surface remote from said stabilizing surface).

U.S. Pat. No. 4,057,840 discloses a cartridge that provides a convexly curved cylindrical surface. A drive spindle has axially extending drive pins that enter holes in a flexible disk to rotate the disk.

These configurations enable reading and writing on only one side of the flexible disk. It would, of course, be preferable if improved operational characteristics achieved with curved stabilizing surfaces could be obtained using a cartridge that would enable recording on both sides of the flexible disk.

SUMMARY OF THE INVENTION

Toward this end and according to the invention, a flexible disk is disposed in a cartridge comprising two substantially identical housing portions so formed as to enable the cartridge to be inserted in either of two positions on a drive spindle. Each housing portion has a slot through which a recording and/or playback head may access the then adjacent underside of the disk.

To insure reversibility of the cartridge without loss of mechanical stability during rotation of the disk, the housing portions provide respective Bernoulli stabilizing surfaces which face each other when the cartridge is assembled. According to one embodiment, each stabilizing surface has two generally diametrically opposed generally flat chordal parts that extend upwardly and downwardly, respectively, at equal acute angles from opposite edges of a central part that is perpendicular to the axis of the drive spindle. The edges of this central part from which these chordal parts extend may be parallel or divergent. According to another embodiment of the invention, each housing portion of the cartridge provides a stabilizing surface having only a single chordal part that extends upwardly (or downwardly) at said acute angle from a remaining part that is perpendicular to the axis of the drive spindle.

Other objects and advantages will become apparent from the following more detailed description of preferred embodiments of the invention and from the accompanying drawings.

BRIEF DESCRIPTION OF THE DRAWINGS

FIG. 1 is a plan view, partially broken away, of a reversible cartridge containing a flexible disk rotatable relative to a selectable one of two spaced Bernoulli stabilizing surfaces and constructed according to one embodiment of the invention;

FIG. 2 is a sectional view taken along the line 2—2 of FIG. 1;

FIG. 3 is a sectional view taken along the line 3—3 of FIG. 1;

DESCRIPTION OF PREFERRED EMBODIMENT—FIGS. 1-4

Figure 4:
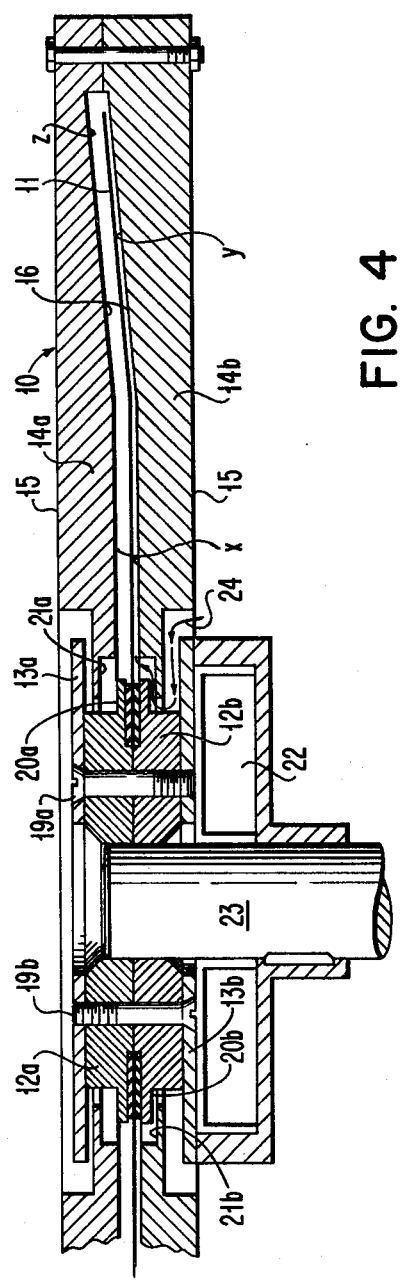
FIG. 4 is a fragmentary sectional view, to enlarged scale, of the cartridge of FIG. 1 mounted in operative position.

As illustrated in FIGS. 1-3, a cartridge 10 embodying the invention comprises a flexible record disk 11 suitably clamped between two substantially identical hubs 12a,b that are secured to respective drive plates 13a,b. The assemblage 11, 12a,b, 13a,b is rotatably disposed as a unit within two stationary housing portions 14a,b of substantially identical configuration. Portions 14a,b each have a flat surface 15 and remote therefrom an irregular surface 16. The cartridge is assembled such that the respective irregular surfaces 16 are substantially uniformly spaced facing each other; whereas the flat surfaces 15 are at opposite exposed sides of the cartridge.

Each surface 16 comprises a central part x surrounding the respective hub 12a,b and lying in a plane perpendicular to the axis of disk rotation. Each surface 16 also comprises a pair of diametrically opposed generally flat chordal parts y,z bent or creased along lines 17a,b, respectively, so as to extend at equal acute angles a, but in opposite directions (i.e., upwardly and downwardly) from central part x.

Each housing portion 14a,b has a respective slot 18a,b through which a magnetic recording and/or playback head 100 can access one or the other recording surface, respectively, of the flexible disk 11. As illustrated, head 100 is mounted on an arm 101 that is pivoted at 102; and slots 18a,b are therefore curved to conform to the radius of arm 101. It should be noted that the housing portions 14a,b are assembled such that line 17a of 14a overlies line 17b of 14b, and vice versa; this results from the fact that the upper portion 14a is turned over 180° left-to-right with respect to the lower portion 14b. Consequently, slots 18a,b will be disposed as shown in FIG. 1, and head 100 will access the lower recording surface of disk 11 through slot 18b.

Referring now to FIGS. 1 and 4, assemblage 11, 12a,b 13a,b preferably is secured together by a plurality of screws 19a,b. Screws 19a are inserted from the upper side of cartridge 10, as viewed in FIG. 4; whereas screws 19b are inserted from the lower side of the cartridge. This arrangement enables the housing portions 14a,b to be of identical configuration while at the same time enabling connection of assemblage 11, 12a,b, 13a,b into a unitary structure.

This assemblage is movable a limited axial distance relative to housing portions 14a,b. The limits of such movement are defined by contact of hub shoulder 20a or b selectively with housing shoulder 21a or b. This limited movement enables the drive plate 13b to be electromagnetically attracted to a magnetic chuck 22 when cartridge 10 is mounted in operative position on a drive spindle 23, as shown in FIG. 4, said chuck being keyed to said spindle. Note that chuck 22 draws disk 11 closer to the chordal parts y,z of surface 16 of housing portion 14b.

Each surface 16 is preferably etched, dimpled or otherwise treated so as to provide a roughened surface to prevent the disk from adhering to the surface during start-up as a result of adhesive forces. Each roughened surface 16 constitutes a Bernoulli stabilizing surface. As chuck 22 through drive plate 13b and hub 12 rotates disk 11 at high speed, air is drawn in through apertures in the cartridge housing, as denoted by arrows 24. This causes the spinning disk to be supported on a thin (several mils) air cushion.

In actual tests, it was found that satisfactory mechanical stability was obtained during disk rotation if the angles $\alpha$ varied from 6° to 20°, with best results when $\alpha$ was equal to about 8° to 10°. As illustrated, bend lines 17a,b diverge at equal acute angles $\phi$ (FIG. 1) from a diametral line d. Angle $\phi$ will be determined by the diameter of hub 12, but preferably is in the order of about 15°. Bend lines 17a,b should preferably intersect diametral line e at a point within one-quarter of a diameter from diametral line d, as shown in FIG. 1, in order to achieve good stabilization. During other tests, when parallel bend lines were used (in lieu of the divergent lines 17a,b), it was noted that stabilization decreased as the bend lines were moved outward a distance greater than one-quarter of the diameter of the disk from diametral line d.

As earlier noted and as illustrated, slots 18a,b are curved to permit access by a pivoted recording/playback head 100. Note that if the cartridge is inserted in reversed relation onto spindle 23 by flipping the cartridge over from left to right as viewed in FIG. 1, slot 18a will be disposed in the same position as that in which slot 18b is shown in FIG. 1. Hence, it is possible to record on both surfaces of disk 11 and to access either surface selectively with a single head 100.

Alternatively, radial slots may be used (in lieu of the curved slots 18a,b) if it is preferred to move a recording/playback head radially of the disk. Also, it should be noted that the center of the slots need not coincide with the radius of the disk. They may, if desired, be offset from a radial line; but, in such case, they should preferably be about halfway between a radial line and the downturned part z when the rotational direction of disk 11 is clockwise.

Another advantage of this reversible cartridge 10 is the fact that a servo track (not shown) need be recorded on only one of the recording surfaces of disk 11. Since the servo signal is of low frequency, it can be read through the polyethylene terephthalate substrate to which the magnetizable coatings are applied to form the record disk.

DESCRIPTION OF ALTERNATE EMBODIMENT—FIGS. 5-6

In the cartridge 10' constructed according to this embodiment, like reference numerals but primed are used to denote parts that are similar to those in the embodiments of FIGS. 1-4. Cartridge 10' differs from cartridge 10 in that the surface 16' of each housing portion 14a', 14b' is modified. Part z is eliminated and the part x' that is perpendicular to the axis of disk rotation is enlarged to embrace the entire surface 16' except for divergent part y'.

Figure 5:
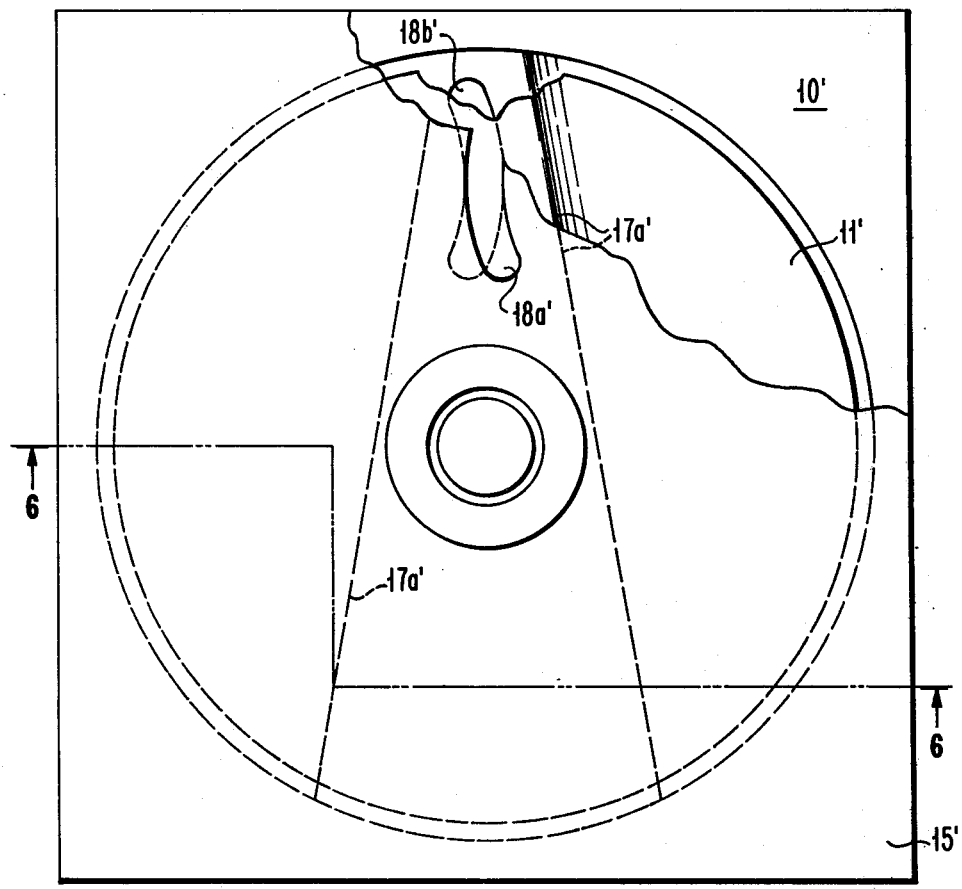
FIG. 5 is a plan view, partially broken away, of a flexible disk-containing cartridge constructed according to another embodiment of the invention.
Figure 6:
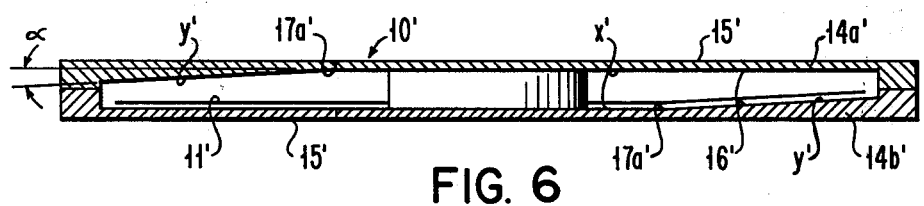
FIG. 6 is a sectional view taken along the line 6—6 of FIG. 5.

Tests have indicated satisfactory stability using just this single chordal bend y' in each stabilizing surface 16', although the embodiment of FIGS. 1-4 is preferred. Note that the surfaces 16' face each other; but, as illustrated in FIG. 6, part y' diverges downwardly from upper housing portion 14a' and part y' diverges upwardly from lower housing portion 14b'. If mounted over the drive spindle (not shown) with portion 14b' adjacent the head, the head will access the then lower recording surface of disk 11 as it is rotated on the air cushion above lower surface 16'. If the cartridge of FIG. 5 is reversed 180° left to right for mounting on the drive spindle to access the other recording surface of the disk (which will now be the lower recording surface), it will appear exactly as shown in FIG. 6 except that housing portions 14a' and 14b' will be respectively below and above disk 11.

Note that thickness of cartridge 10' is reduced with the single bend configuration. Also, with either embodiment, the bend angle $\alpha$ should preferably be kept as small as possible to minimize thickness of the cartridge 10 or 10', but just large enough to insure the required mechanical stability for the selected disk size, hub size and rotational speed. Also the thickness of the cartridge 10 or 10' may be reduced by having the outer edge portions of parts y,z of surface 16 or of part y' of surface 16' bend or curve toward the part x or x', as the case may be.

While the invention has been particularly shown and described with reference to preferred embodiments thereof, it will be understood by those skilled in the art that the foregoing and other changes in form and detail may be made therein without departing from the spirit, scope and teaching of the invention. Accordingly, the apparatus herein disclosed is to be considered merely as illustrative, and the invention is to be limited only as specified in the claims.

We claim:

1. A reversibly mountable flexible disk cartridge for use with a single recording and/or playback head means, said cartridge comprising:
    two housing portions of substantially identical configuration disposed in reverse relation with their respective non-planar one surfaces substantially uniformly spaced facing each other;
    a flexible record disk disposed between said one surfaces; and
    means for rotating the disk relative to said housing portions;
    each of said housing portions having at least one part of its said non-planar one surface angularly disposed with respect to another part and constituting a rigid Bernoulli stabilizing surface so as to enhance the stability of the disk during rotation;
    each of said housing portions also having a slot for enabling the head means without reorientation to access either side of the disk selectively through one or the other of the slots according to which side of the cartridge is mounted adjacent the head means.

2. A cartridge according to claim 1, wherein
each said one part is constituted by a generally flat chord-like surface that extends substantially at a preselected angle from said other part, and
said other part lies in a plane substantially perpendicular to the axis of disk rotation.

3. A cartridge according to claim 2, wherein said preselected angle lies within the range from about 4° to 20°.

4. A cartridge according to claim 2, wherein each chord-like flat surface diverges at an included angle of about 15° from a true diametral line.

5. A cartridge according to claim 1, wherein each of said one surfaces comprises two parts, one of which extends upwardly and the other downwardly from opposite edges of said other part, said two parts being so configured and disposed that different ones of said two parts are substantially uniformly spaced facing each other.

6. A cartridge according to claim 1, wherein
said other part is substantially flat and lies in a plane perpendicular to the axis of disk rotation, and
there are two parts disposed substantially at a preselected angle and defined by two generally flat chord-like portions that extend at substantially equal acute angles from said other part, but with one chord-like portion inclined generally upwardly and the other generally downwardly from said plane.

7. A cartridge according to claim 6, wherein said preselected angle lies within the range of about 4° to 20°.

8. A cartridge according to claim 6, wherein said chord-like portions diverge at an included angle of the order of about 15° from a true diametral line.

9. A cartridge according to claim 1, wherein each slot is curved relative to a radial line to permit access by a pivoted head means.

10. A cartridge according to claim 1, wherein
said other part is substantially perpendicular to the axis of disk rotation, and only a single one part is provided and it extends from and generally upward relative to said other part,
said housing portions being so assembled and disposed that said one part of one housing portion overlies said other part of the other housing portion and vice versa.

* * * * *